Figure 1:
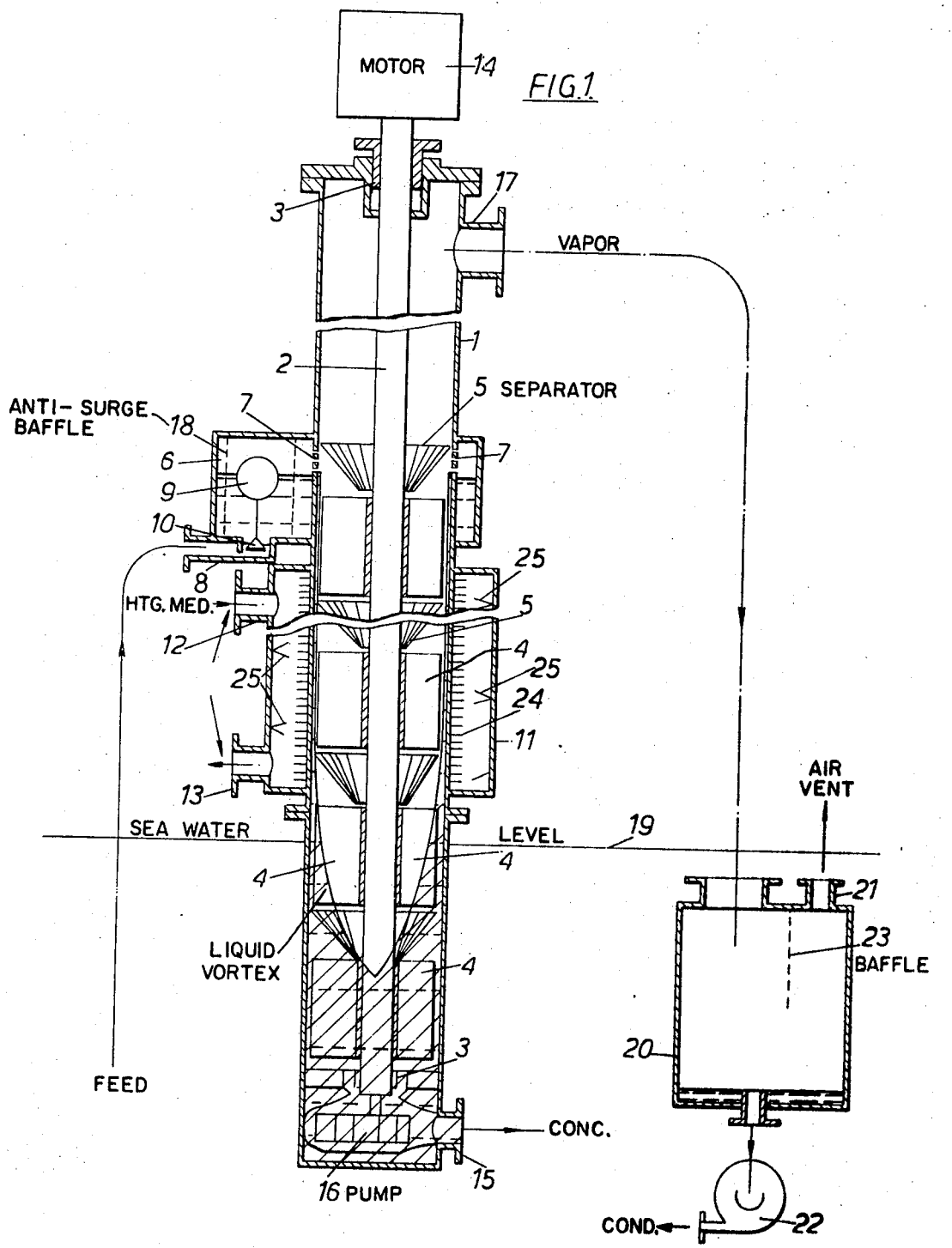

United States Patent
Aitchison

[15] 3,654,981
[45] Apr. 11, 1972

[54] EVAPORATORS

[72] Inventor: Thomas Edmondston Aitchison, 86 Upper Park, Harlow, England

[22] Filed: Jan. 19, 1970

[21] Appl. No.: 3,803

[30] Foreign Application Priority Data

Jan. 30, 1969 England..................................5,238/69

[52] U.S. Cl.......................................159/6, 159/47, 233/11, 233/13

[51] Int. Cl. ................B01d 1/22, B01d 1/00, B04b 15/08, B04b 15/02

[58] Field of Search....................159/6, 6 W, 13 A; 202/236, 202/238; 203/89; 233/11, 12, 13

[56] References Cited

UNITED STATES PATENTS

| | | | |
|---|---|---|---|
| 2,233,019 | 2/1941 | Linderman, Jr. .....................261/79.1 |
| 2,866,499 | 12/1958 | Haley...................................159/14 X |
| 538,556 | 4/1895 | Theisen ....................................159/6 |
| 1,748,178 | 2/1930 | Hume......................................277/13 |
| 1,844,643 | 2/1932 | Yarmett................................196/128 |
| 3,300,868 | 1/1967 | Anderwert....................................34/5 |
| 3,311,457 | 3/1967 | Goossens...............................23/283 |
| 3,423,782 | 1/1969 | Klosel...............................159/6 W X |
| 3,486,984 | 12/1969 | Sperry ....................................202/172 |
| 3,472,304 | 10/1969 | Evkin........................................159/6 |
| 3,547,593 | 12/1970 | Olevsky et al..........................159/6 X |

Primary Examiner—Norman Yudkoff
Assistant Examiner—J. Sofer
Attorney—Young & Thompson

[57] ABSTRACT

An evaporator comprises an enclosure which receives liquid for evaporation, and in said enclosure there is set up by rotor means a substantially vertical rotating cylindrical vortex column of the liquid surrounded by a gaseous medium. The column is either contained in a sleeve which rotates with the column and the rotor, or has an outer surface, without any rigid surround, in open contact with the gaseous medium. The column is vaporized by heat transferred to it from the gaseous medium, and the vapor is conducted from the enclosure. Additional liquid is fed into the enclosure to replace that lost by evaporation and thus to maintain the vortex column.

3 Claims, 3 Drawing Figures

EVAPORATORS

This invention relates to evaporators suitable, for example, for distilling the liquid solvent from a chemical solution, and aims at the provision of an evaporator suitable more especially, but not exclusively, for obtaining fresh water from sea water.

The invention consists in a method of effecting liquid evaporation wherein, in a substantially closed space charged with a gaseous heat-transfer medium, there is generated a substantially vertical, cylindrical rotating vortex column of the liquid, which column is substantially free from frictional retardation by a solid surrounding wall, applying heat by said gaseous medium to the wall of said liquid vortex column in order to form vapor therefrom which is conducted away from the enclosure.

The invention further consists in a liquid evaporating device comprising an enclosure, means for charging said enclosure with liquid to be evaporated, rotor means including vanes for generating in said enclosure a substantially vertical, rotating, cylindrical vortex column of said liquid, said column rising from the base of said enclosure, means for introducing a gaseous heat-transfer medium into said enclosure, and thereby heating the wall of said vortex column, in order to form vapor therefrom, and means for leading away said vapor from said enclosure.

The vortex forming means may comprise vanes or paddles rotatable in the liquid. The vanes or paddles may be located in a cylindrical housing into which the liquid is admitted to be formed into a vortex therein by the vanes or paddles. The casing may be provided with means, e.g., an external jacket for steam or hot gas, to heat it along part of its length and thereby to heat, and evaporate some of, the comparatively thin wall of liquid formed as part of the relatively stationary vortex inside the housing. Means, such as pumping means, may be provided to withdraw liquid from the base of the housing and/or to feed in liquid at a higher point of the housing.

Figure 2:
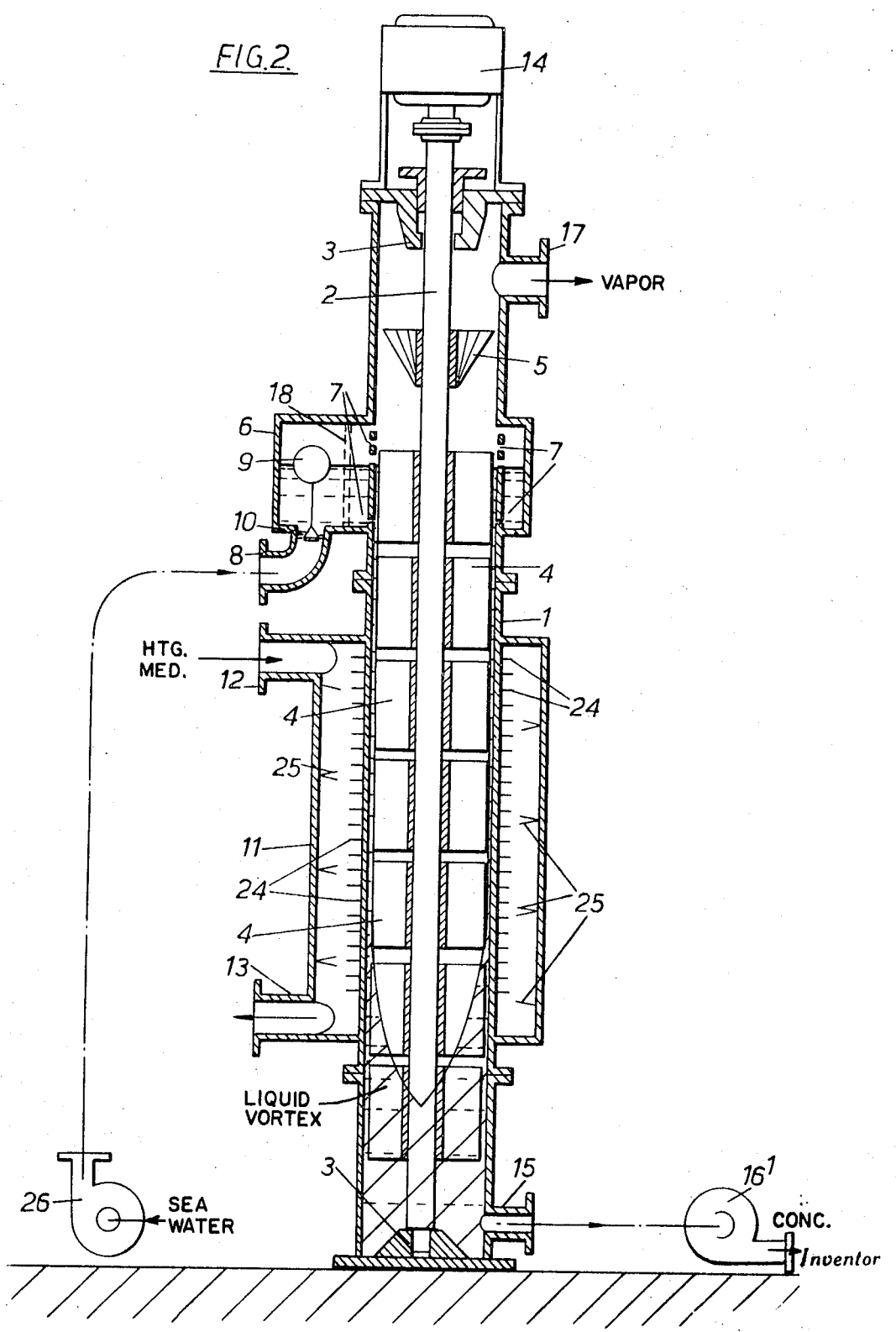
Figure 3:
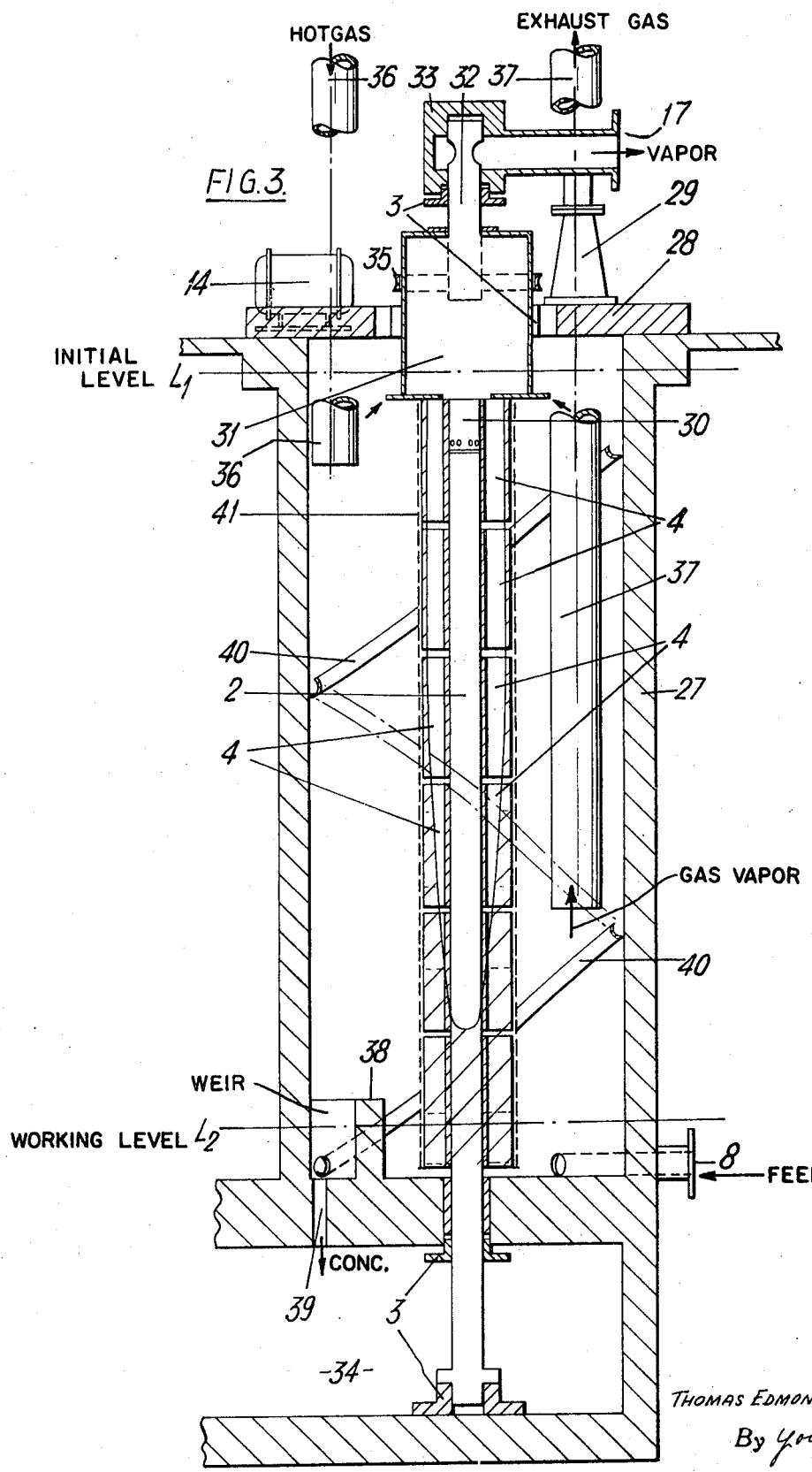

The invention will be clearly understood from the following description of two forms (given, however, merely by way of example) which it may assume, and this description will be more readily followed by reference to the accompanying drawings wherein FIG. 1 represents in side sectional elevation an evaporating device, the housing pressure being sub-atmospheric, FIG. 2 represents a like view of a modified form of evaporator, the housing pressure being equal to or above atmospheric and FIG. 3 represents in side sectional elevation one form of evaporator in accordance with the invention.

As shown in FIG. 1 of the aforesaid drawings, an evaporating device (suitable, for example, to obtain fresh water from sea water) comprises a cylindrical housing or column 1 fitted with a sealed axial shaft 2 mounted in top and bottom bearings, 3. In spaced positions along the lower part of the shaft 2, e.g., up to about two-thirds of its height, the shaft is provided with groups of radially projecting vanes or paddles 4; and above each groups may be secured to the rotor a separator 5, being a conical array of vanes.

At, or in the neighborhood of, the top separator and vane assembly there is secured externally to the housing or column 1 an annular tank 6 communicating with the interior of the housing 1 through openings or perforations 7 in the housing wall. A pipe 8 communicates with an aperture in the base of the tank 6 allowing liquid for evaporative treatment (when housing 1 is under vacuum), to be drawn into the tank 6, and by way of the openings or perforations 7 into the column 1. A float 9 in the tank 6 controls a valve 10 in the inlet of the tank in order to control the liquid in the tank and thus the in-feed of liquid.

Below the tank 6, over a substantial length of the column, there is provided a surrounding jacket 11 with an inlet 12 and outlet 13 for a heat-carrying medium whereby the housing 1 can be heated. The housing 1 may be provided with gills or fins 24: and the interior of the jacket 11 may be fitted with a helical annulus 25, to direct the heat carrying medium over the gill surface 24.

A motor 14 at the top of the housing drives the shaft 2, and the housing at its base has a side outlet 15 for liquid. A pump 16 may be fitted to the housing to expel liquid. Near to its top end the housing is provided with a vapor outlet 17. The inlet to the tank 6 may be provided with a metal anti-surge baffle 18 to protect the float 9.

For use the above described device may be partially immersed in liquid, e.g., sea water, under treatment, the top level of which is represented by the line 19. A tube, e.g., a flexible hose, not shown, is connected to the tank inlet 8 and its other end immersed in the liquid. When the pump 16 is operated it withdraws liquid from the housing 1, and vacuum draws in a replacement supply by way of the flexible hose inlet 8, tank 6 and perforations 7 into the housing. The motor 14 in operation rotates the shaft 2, vanes 4 and separators 5, and sets up a vortex column of liquid in the housing 1, as represented by hatching in the aforesaid drawings. This vortex has a comparatively thin, high velocity "wall" against the wall of the housing 1 in the neighborhood of the jacket 11, and a heating medium passed through the jacket readily heats this vortex zone, converting some of the liquid to vapor, which rises through the housing 1 to escape by the outlet 17 and be conveyed by suitable piping to a condenser 20. The separators 5 help to restrain liquid particles entrained in the vapor from being carried to the condenser, (which may, as shown, be immersed in the liquid). The condenser 20 may be connected by an outlet 21 to an air extractor, and the condensate may be withdrawn from the base of the condenser by a pump 22 feeding it to a storage tank or point of supply. A baffle or screen 23 may be fitted between the inlet and the air outlet 21 of the condenser.

The device may be operated as above described while suspended above, and not immersed, in the liquid, (or indeed at some substantial distance away from the liquid) provided the float 9 is less than 25 feet above the liquid level 19. Alternatively (whether the device is or is not immersed) a feed pump, not shown, may be connected to the tank inlet 8, and have its intake line dipping into the liquid. Alternatively pump 16 may be replaced by a separate pump.

A modified form of evaporator is shown in FIG. 2 where the same references indicate components corresponding to those described above with reference to FIG. 1. This evaporator is illustrated as mounted upon a solid base, e.g., the ground, and a feed pump 26 is provided to introduce sea water, or other liquid to be treated, into the inlet 8. The pump 16 of FIG. 1 may be omitted from the housing 1 and replaced by a separate pump 16' drawing liquid from the outlet 15. The device is supplied by the feed pump 26 with liquid, e.g., sea water, under treatment, through the inlet pipe 8, the float controlled valve 10, and the openings 7, into the housing 1. The motor 14 in operation, rotates the shaft 2, with the vanes 4 and separator 5, and sets up a vortex column of liquid in the housing 1, as represented by hatching. This vortex, being a paraboloid, has a comparatively thin, high velocity "wall" against the wall of the housing 1 in the neighborhood of the jacket 11, and a heating medium passed through the jacket 11, readily heats this vortex zone, converting some of the liquid to vapor, which rises through the housing to escape by the outlet 17. The vortex height or liquid subnormal, is a function of the motor speed and is constant for any specific speed of the motor 14, and for a given housing diameter.

When the pump 16' is operated it withdraws sufficient liquid from the housing 1 to maintain any required quantity for the liquid contained in the housing 1. The vortex is thus positioned in the housing 1 the datum being the level of the openings 7. The separator 5 helps to restrain liquid particles entrained in the vapor from being carried over to the vapor outlet 17.

The device can be used as a single stage unit, when the vapor is released through the outlet 17 to a separate condenser such as 20, FIG. 1, not shown in FIG. 2. The device is also suitable for use as part of a multi-stage unit, when the vapor is released through outlet 17 to the jacket 11 of another similar unit, thus acting as a heating medium in the second unit.

In modified evaporating devices incorporating the invention the solid-wall of the cylinder or column 1 may be replaced by a perforated wall, or entirely omitted, and an evaporator having this feature is illustrated in FIG. 3.

An outer casing 27 is closed at the top by a cover 28, supporting the motor 14 and a pedestal 29 on which is mounted the outlet 17. The shaft 2 supporting vanes 4 is rigid at its upper end with a hollow, apertured tube 30 fixed to and communicating with a cylindrical collecting chamber 31 which projecting through its roof has a tube 32 having side apertures at its upper end. This tube 32 extends into a bore in a block 33 forming part of and communicating with the outlet tube 17, so that vapor from the liquid vortex can pass through tube 30, chamber 31, tube 32 and block 33 to escape by the outlet 17. Both the chamber 31 and tube 32 run in bearings 3 forming upper shaft bearings, while like bearings 3 for the lower end of the shaft which extends through the base of the enclosure 27, to a lower base of a chamber or duct 34. The chamber 31 is rotated by an external gear or pulley 35, driven by connection to the motor 14; and the shaft 2, with its vanes, is driven by the chamber 31.

Through the cover 28 extend two tubes 36, 37, the tube 36 extending only a little below the cover, and the tube 37 to a much lower level in the enclosure 27, e.g., to about two-thirds of its depth. At its lower end the enclosure 27 has the inlet 8 to feed in liquid under treatment, and also has an open-topped weir 38 surrounding a space which communicates by a passage 39 with the chamber or duct 34. Internally a helical channel or gutter 40 is mounted on the wall of the casing 27, and at its lower end communicates through the wall of weir 38 with the surrounded space and the passage 39.

As illustrated a cylinder 41 through which liquid can pass, (e.g., of perforated metal, or a composite construction of perforated metal and fabric) surrounds the vanes 4 (to which it may be attached) and extends along most of the length of the shaft 2 from the base of the enclosure to the base of the chamber 31.

In operating the device shown in FIG. 3 the enclosure 27 is first filled with liquid to be treated (e.g., through the inlet 8) up to a level such as $L_1$ near to the top of the enclosure. When the motor 14 is started up, and rotates the shaft 2 a vortex (shown as before by hatching) is established round the shaft, assisted by the pressure difference built up between the exterior and interior of the cylinder 41. When a stable condition is reached liquid is withdrawn from the enclosure 27 by way of the passage 39, until the liquid in the enclosure falls to a working level $L_2$ (maintained by liquid infed through the inlet 8 as and when necessary.) It will be noted that the vortex is maintained in the condition illustrated when liquid external to the cylinder 41 is withdrawn. When the space in the enclosure 27 surrounding the vortex is substantially free of liquid a heating medium, such as hot air or other gas, is introduced through the tube 36, and after it has heated the vortex is withdrawn by way of tube 37. Liquid Forming the thin vortex "wall" when heated vaporizes inside the vortex, and is withdrawn by way of the tubes 30 and 32, and outlet 17 as described above. Spray discharged from the lower surfaces of the collecting chamber 31 is collected by the channel or gutter 40, and conducted by it to the escape passage 39.

In a further modified form of the invention the cylinder 41 may be entirely omitted, the vortex being set up, and maintained (even when liquid is withdrawn from the upper part of the enclosure 27) from the liquid below the working level $L_2$, by suitable speed of rotation of the shaft 2, and appropriate pressure differences between the interior and exterior zones adjacent to the vortex "wall."

It should be understood that the invention is not limited solely to the details of the forms described above which may be modified in order to meet various conditions and requirements encountered, without departing from the scope of the invention.

What I claim is:

1. A method of effecting liquid evaporation, comprising substantially filling a closed space with a liquid to be evaporated, rotating rotor means in the liquid to set up a vortex in the liquid, removing some of the liquid forming the more remote peripheral zones beyond the rotor means from the closed space and simultaneously replacing the removed liquid by a hot gaseous medium in order to leave in said closed space a substantially vertical rotating liquid vortex column having substantially its whole outer surface in open contact with the gaseous medium in the remote zones in the closed space, applying heat by said gaseous medium to the outer surface of said liquid vortex column in order to form vapor therefrom, removing said vapor and gaseous medium from said remote zones in said closed space, removing vapor from the inner surface of said liquid vortex column, and supporting the liquid vortex column by the difference of gaseous pressures acting on the outer and inner surfaces of the liquid vortex column.

2. A liquid evaporating device comprising an enclosure having a cover, means for charging said enclosure with liquid to be evaporated, rotor means including vanes for generating in said enclosure a substantially vertical, rotating, cylindrical vortex column of said liquid, said rotor means having a collecting chamber for vapor removal from within said liquid vortex column fixed to and rotatable with said rotor means and extending through said cover, said liquid column rising from the base of said enclosure, means for introducing a gaseous heat-transfer medium into said enclosure surrounding said liquid column, and thereby heating the outer surface of said liquid vortex column, in order to form vapor therefrom, means for leading away said vapor from said collecting chamber, and means for removing liquid from a lower peripheral portion of said enclosure thereby to aid in establishing in said enclosure said liquid vortex column without any surrounding sleeve for containing said liquid vortex column.

3. A device as claimed in claim 2, and means for feeding liquid into said enclosure to replace liquid lost by evaporation from the liquid vortex column thereby to maintain the liquid vortex column.

* * * * *